United States Patent [19]

Kluver et al.

[11] 4,375,187
[45] Mar. 1, 1983

[54] EJECTION MECHANISM FOR A ROUND BALER

[75] Inventors: Leroy M. Kluver, Celina, Ohio; Richard W. Kunkle, Portland, Ind.

[73] Assignee: The Paul Revere Corporation, Greenwich, Conn.

[21] Appl. No.: 282,610

[22] Filed: Jul. 13, 1981

[51] Int. Cl.³ .................... B30B 5/06; A01D 39/00
[52] U.S. Cl. .................................. 100/88; 56/341
[58] Field of Search .............. 100/88, 89; 56/341, 56/342, 343

[56] References Cited

U.S. PATENT DOCUMENTS 4,334,467  6/1982  Nishibe et al. .................. 100/89

FOREIGN PATENT DOCUMENTS 2739935  3/1979  Fed. Rep. of Germany ........ 100/89
2034244  6/1980  United Kingdom ................ 56/341

*Primary Examiner*—Peter Feldman
*Attorney, Agent, or Firm*—Robert J. McNair; Abraham Ogman

[57] ABSTRACT

An ejection mechanism is described which automatically assists in the discharge of completed bales from the bale-forming chamber. As implemented the ejection mechanism forms a part of a baler which produces generally cylindrical bales in a chamber of fixed size having closed sidewalls adjacent the ends of the bale. The baling chamber is divided into two parts with one portion being hinge mounted along its front edge to allow its second or rear edge to swing open upwardly to provide a gate through which completed bales can be discharged. The second portion of the baling chamber contains a bottom conveyor for imparting rotational motion to the bale during the crop gathering and bale forming process. When the bale in the chamber is completed and ready for discharge, the gate swings open and the bottom conveyor continues moving in a front to rear direction. Simultaneously with the opening of the gate, bale contacting means are applied at the top edges of the bale to introduce a coupling force which tends to stop the bale from turning in place, thereby enabling the bottom conveyor to transfer the bale out the gate of the machine.

6 Claims, 7 Drawing Figures

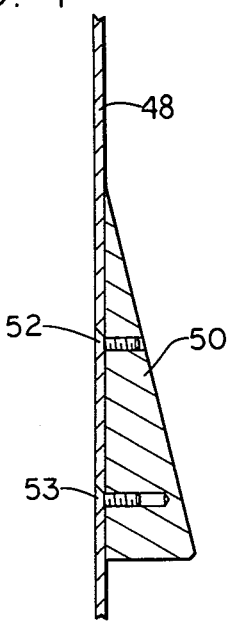
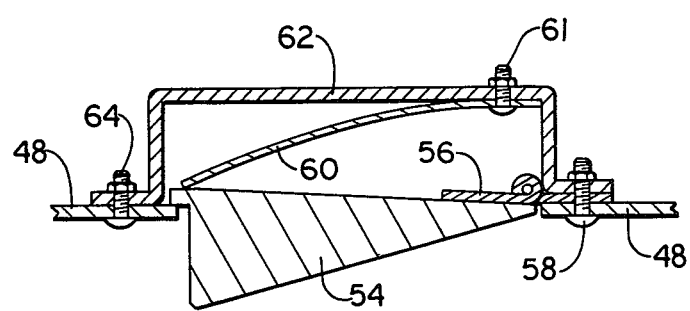
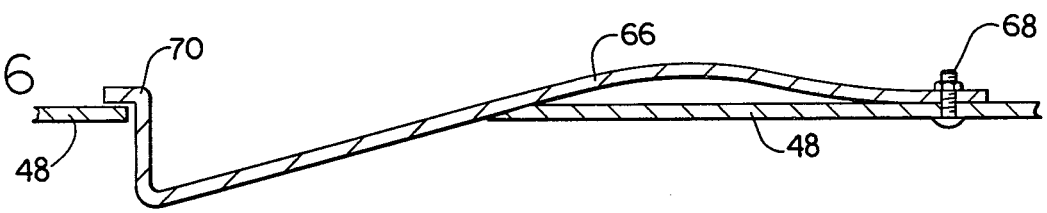
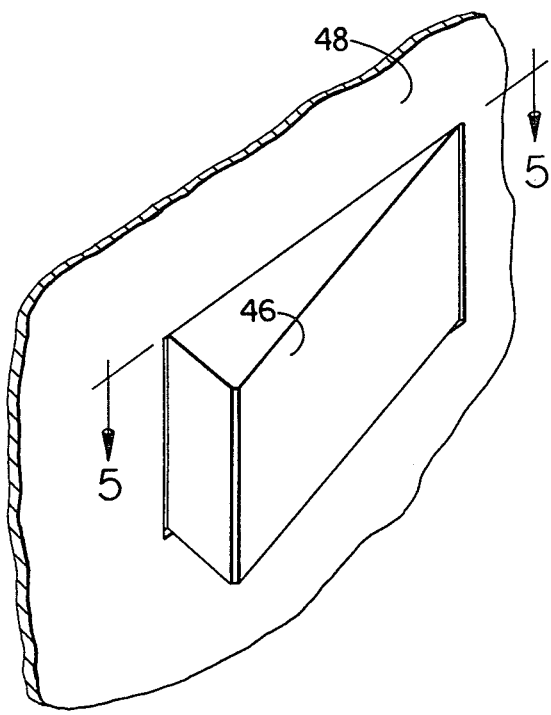

EJECTION MECHANISM FOR A ROUND BALER

BACKGROUND OF THE INVENTION

This invention relates generally to round bale forming machinery and, more particularly, to an improved ejection mechanism for accomplishing the discharge of the completed bales.

Many bale forming machines exist which form fibrous agricultural crops into bales that are either twine or wire tied. For example, the U.S. Pat. No. 4,009,653 to Sacht discloses a method for forming large round bales in a machine comprising a cage-like frame having a horizontal axis and a generally cylindrical shaped baling zone. Upwardly extending machine sidewalls form the confining end surfaces of the baling zone. A plurality of serially arranged conveying elements enclose and generally define the circumferential periphery of the baling zone. Thus, the size of the baling chamber remains constant during the bale forming process. To accomplish discharge of a completed bale, the baling chamber is divided into two portions approximately along a vertically extending axis cutting plane. The rear portion of the housing is then configured to swing upward from a hinge point at the top, thereby allowing the bale to be discharged rearward.

The U.S. patent application having Ser. No. 162,372 and assigned to the same assignee as this application, now U.S. Pat. No. 4,319,446, discloses bale forming means which differ somewhat from the implementation of Sacht. Two additional rollers are added to support the bottom conveyor belts. As viewed from the side the improved system shows four rollers on which a plurality of laterally spaced belts are trained. The second and third rollers (which are respectively in the forward and aft portions of the conveyor midsection) and the fourth roller (which is at the rear of the machine) are disposed to be generally on the cylindrical periphery of the baling zone. The first roller is in front of and somewhat below the plane containing the axis of the third roller. The invention improves on Sacht in two ways. First, the vertical dimension of the entrance throat is enlarged. This allows the baler to operate in a heavier stand of hay without becoming clogged. Second, by lowering the placement of the front roller, a pickup reel of smaller diameter can be used. This permits the flow of hay being picked up from the windrow to pass into the baling zone without undergoing abrupt changes in direction. The laterally spaced conveyor belts accept the crop material being passed on from the pickup reel and frictionally engage the crop strands to provide inward directed pressure to carry them into the baling zone.

This invention is shown in conjunction with a baler having a bottom conveyor member for receiving agricultural material which is constructed similar to that disclosed in the U.S. patent application having Ser. No. 162,372. With either this or the Sacht machine, a completed bale lies in a depression ahead of the rearmost roller due to the stretching of the belts under the weight of the bale. As the bale is formed it rotates due to the frictional impact of the moving belts. This results in the situation where the bale is rotating on its horizontal axis when the tailgate opens for discharge. If the bale continues to rotate in the depression ahead of the rearmost roller, it will tend to remain slowly turning in place, rather than complete the discharge sequence. Our invention solves this problem by introducing a coupling force which slows the bale from rotating, thereby allowing the bottom conveyor belts to move the completed bale over the rearmost roller and out the back of the machine.

SUMMARY OF THE INVENTION

It is an object of this invention to provide a coupling force which transfers the center of rotation of the completed bale from its central axis to a restraining point situated near its upper edge. Transfer of the center of rotation occurs when the tailgate reaches its fully open state. With the application of the coupling force, the rearward moving bottom conveyor then imparts aft movement to the bale, ejecting it out the back of the machine.

The baler with which the ejection mechanism was first reduced to practice forms generally cylindrical bales in a chamber of fixed size. During the bale forming process, the partially completed bale rotates on a horizontal axis while crop material picked up from a windrow is continuously added to the periphery of the bale. As the baling chamber fills, pressure is exerted on the surrounding enclosure. The enclosure is hinged along the front edge to allow the upper portion to open from the rear like a clam shell to enable discharge of a completed bale. A latch mechanism holds the opposing faces of the enclosure together until the bale is complete.

The ejection mechanism comprises at least one wedge shaped element which extends inwardly from the sidewall of the baling chamber. If two wedges are used they are placed opposite each other, one on each side of the baler. For the case where the baler is configured as described above, the wedges can be located in that portion of the sidewalls which raises up for discharge of the bale. Specifically, for discharge of a bale out of the rear of a machine which opens like a clam shell, the rear tailgate has to raise by an amount equal to the diameter of the finished bale. When hinged at the front of the baling chamber, proportionality shows that for the rear edge to raise one bale diameter, that spot on the chamber sidewall which is adjacent the center axis of the bale will move upwardy by half the diameter of the bale. Therefore, if the wedges extend through the sidewalls at a location slightly below the center axis when the baling chamber is closed, raising of the tailgate to its fully extended position will raise the wedges to a position where they are just below thee top edge of the bale. Further, by orienting the wedges so that the thin edge is toward the front of the machine, power consumption is minimized. There is no snagging of crop strands on the wedges since they readily slip past the end faces of the bale which is turning clockwise as viewed from the right side of the baler.

When the tailgate reaches its fully raised condition the wedges are positioned near the top edge of the bale which is still supported by the lower conveyor belts. The thick end of each wedge now oppoes rotation of the bale since near the top edge the bale is turning from a rear to front direction. Additionally, the completed bale is densely packed at or near its periphery, making far more pronounced interference between the bale end and the wedges. As the wedges begin to dig into the bale, they tend to stop it from turning.

Stopping the bale from turning allows the bottom conveyor to move the bale rearward and out the back of the machine. Thus, use of two properly positioned wedges automatically accomplish initiation of the bale ejection sequence without the use of a complex mechanism which requires operator attention.

BRIEF DESCRIPTION OF THE DRAWINGS

FIG. 4 is a cross sectional view of one version of the wedge.

FIG. 5 is a cross sectional view of a first alternate version of the wedge.

FIG. 6 is a cross sectional view of a second alternate version of the wedge.

FIG. 7 is an isometric view of the wedge depicted in FIG. 5 being taken along line 5—5.

DESCRIPTION OF THE PREFERRED EMBODIMENT

Figure 1:
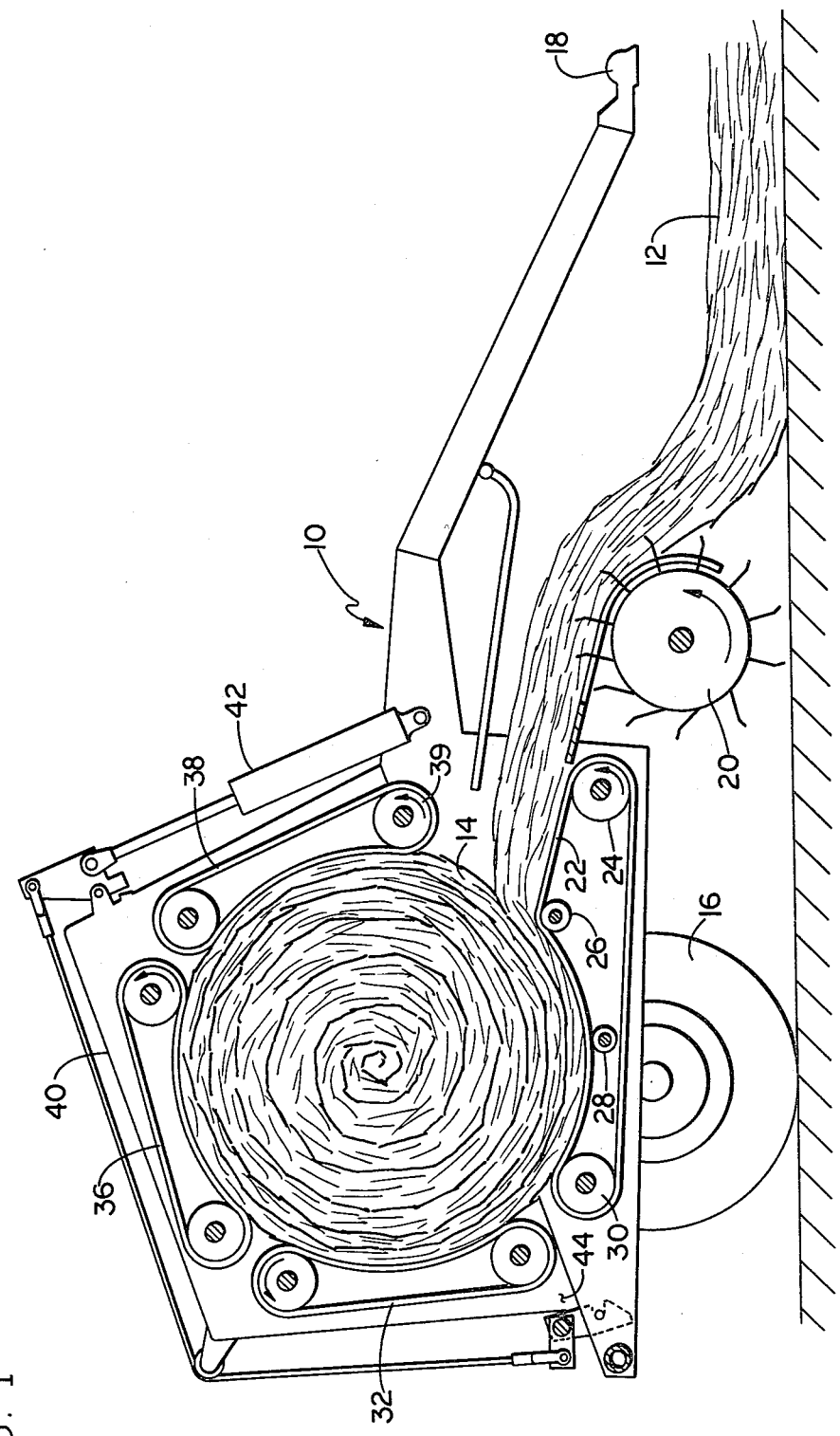
FIG. 1 is a cutaway view of a baler as viewed from the right hand side showing the flow path of hay from the windrow inward to the baling chamber.

FIG. 1 shows a cutaway side view of a baler 10 which gathers crop material from a windrow 12 and forms it into a round bale 14. The baler is supported on wheels 16 and is drawn behind a tractor via hitch 18. Pickup reel 20 gathers the crop from windrow 12 and delivers it to the baling chamber via a conveyor which forms the bottom of the baling chamber. The conveyor comprises a plurality of side by side belts 22 which are entrained over transversely extending rollers 24, 26, 28 and 30.

In the unit recduced to practice, 5 belts 22 were used to span a baling chamber 5 feet long. Rollers 26, 28 and 30 are generally on the periphery of the baling chamber which is cylindrical in shape. Roller 24 is mounted such that its top edge is tangential with a line resting on top of roll 26 and the pickup reel 20. This arrangement helps prevent clogging of crop material in the throat of the machine.

Above the bottom conveyor are three more conveyor assemblies which serve to generally surround the cylindrically shaped baling zone. As may be seen in FIG. 1, each of the serially arranged upper conveyor assemblies 32, 34 and 36 consists of an upstream and a downstream roller over which is entrained a multiplicity of side-by-side belts. All rollers are journalled for rotation in the sidewalls of the machine. The central shaft of each downstream roller extends through the sidewall on the right side of the machine. Sprockets on the extended shafts allow all conveyor assemblies to be driven counterclockwise as viewed in FIG. 1. The subframe on which the upper conveyor assemblies are mounted so as to pivot around the shaft of downstream roller 39 is better shown in FIG. 2 wherein baler 10 is positioned ready to discharge completed bale 14. Subframe 40 is caused to pivot around the shaft of roller 39 by the action of hydraulic piston 42. When piston 42 retracts, the tailgate end 44 rises a full bale width to allow the completed bale 14 to be discharged out the rear of the baler.

Figure 2:
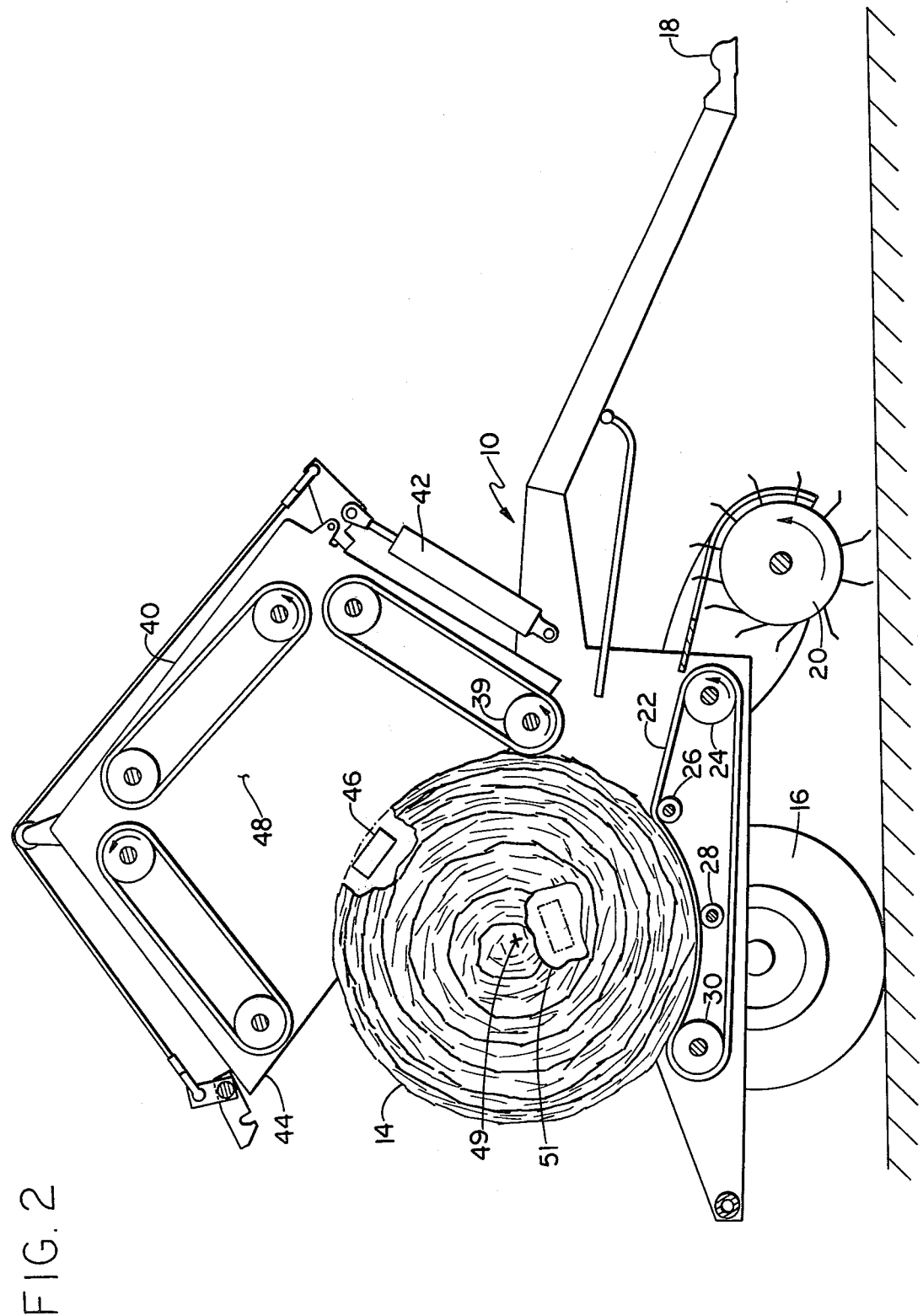
FIG. 2 is a cutaway view of the baler showing the tailgate raised for discharge of a completed bale.

Our invention pertains to an ejection mechanism which aids in the discharge of bale 14 when the baler tailgate 44 is opened to the configuration shown in FIG. 2. The ejection mechanism includes a wedge shaped component 46 which extends inward from the sidewall 48 of subframe 40. When the tailgate is in the raised position shown in FIG. 2, the wedge shaped component 46 intercepts the end of the bale near upper bale edge 47 as shown by the cutout. When the tailgate is closed (See FIG. 1) the wedge shaped component will be just below the central axis 49 of the bale as seen at bale cutout 51 in FIG. 2. With subframe 40 in the closed position, wedge shaped component 46 extends inward into the baling chamber at a location which is near the central axis of the bale. The crop material is rather loosely packed at or near the center of the bale. Thus, there is very little resistance presented by the wedge shaped component during the formative stages of the baling operation.

Further, as may be seen in FIG. 7, the wedge shaped component extends through sidewall 48 in a manner such that friction is minimized furing the bale forming phase when the tailgate is closed. With the bale rotating clockwise during the forming phase as seen in FIG. 1, the end of the bale next to wedge shaped component 46 moves from right to left across the FIG. 7 configuration. As a result, there is very little interference between the wedge shaped component and the end of the bale. The crop material readily slips past the gentle rise in the incline.

FIGS. 4, 5 and 6 show alternate ways of making the wedge shaped component which projects into the baling chamber from sidewalls 48. The FIG. 4 implementation was the first one reduced to practice. A wedge shaped block 50 was secured by bolts 52 and 53 to the inside of sidewalls 48 at a location which was somewhat below the central axis 49 of the baling chamber when tailgate 44 was in the closed position shown in FIG. 1. FIG. 5 shows an alternate configuration and represents a cross section of a cut made along line 5—5 of FIG. 7. The FIG. 5 implementation shows wedge 54 attached at its narrow end to hinge 56. The second end of hinge 56 is secured by bolt 58 to the back side of sidewall 48. The thick end of wedge 54 is held in the baling cavity by leaf spring 60. The leaf spring is held in position against wedge 54 by bolt 61 which secures the second end of the leaf spring to generally U-shaped bracket 62. The U-shaped bracket is secured to sidewall 48 by means of bolts 58 and 64. With the FIG. 5 implementation, pressure by the end of the bale on the wedge causes it to flex and move out of the way in response to the build-up of forces within the chamber.

FIG. 6 shows a second alternate wedge shaped component which flexes in and out in response to pressure from the baling chamber. In FIG. 6 the wedge consists of a long leaf spring 66 which is secured at its first end to sidewall 48 by means of bolt 68. The second end of leaf spring 66 is given a wedge shape with a lip 70 at the very end which serves to hold the wedge member a specified amount into the chamber.

It will be understood that there can be two of the wedge shaped components 46 on each baler. One is on sidewall 48 as shown in FIG. 1. The second would be located on the near sidewall on the right hand side of the baler in a position symmetric with the one on left sidewall 48.

The intended task of the two wedge shaped components 46 comes into operation when subframe assembly 40 is raised to the tailgate-open stance shown in FIG. 2. Prior to raising tailgate 44, it will be assumed that bale 14 has achieved full size and that progress along the windrow has stopped so that the pickup reel 20 is no longer delivering crop material to the baling chamber. It is further assumed that completed bale 14 has been wrapped with twine to ensure that the compressed status of the crop material is retained both during and after discharge.

Prior to, during and after the opening of tailgate 44, belts 22 will be moving counterclockwise as viewed in FIG. 2. This front to rear movement of the bottom conveyor imparts a clockwise rotation to bale 14. Since the bale sets in a depression formed by the relative positioning of rollers 26, 28 and 30, there is a tendency for bale 14 to continue to remain rotating in place as shown in FIG. 2 even after the tailgate opens. Wedges 46 counteract this tendency. In the tailgate open position, wedges 46 are located just below the top edge of the bale (See cutout in FIG. 2). The blunt end of each wedge gouges into opposite ends of the bale. This interference action tends to stop the bale from turning. Stopping the bale from turning allows the bottom conveyor to transfer the bale rearward and over the hump caused by roller 30.

Figure 3:
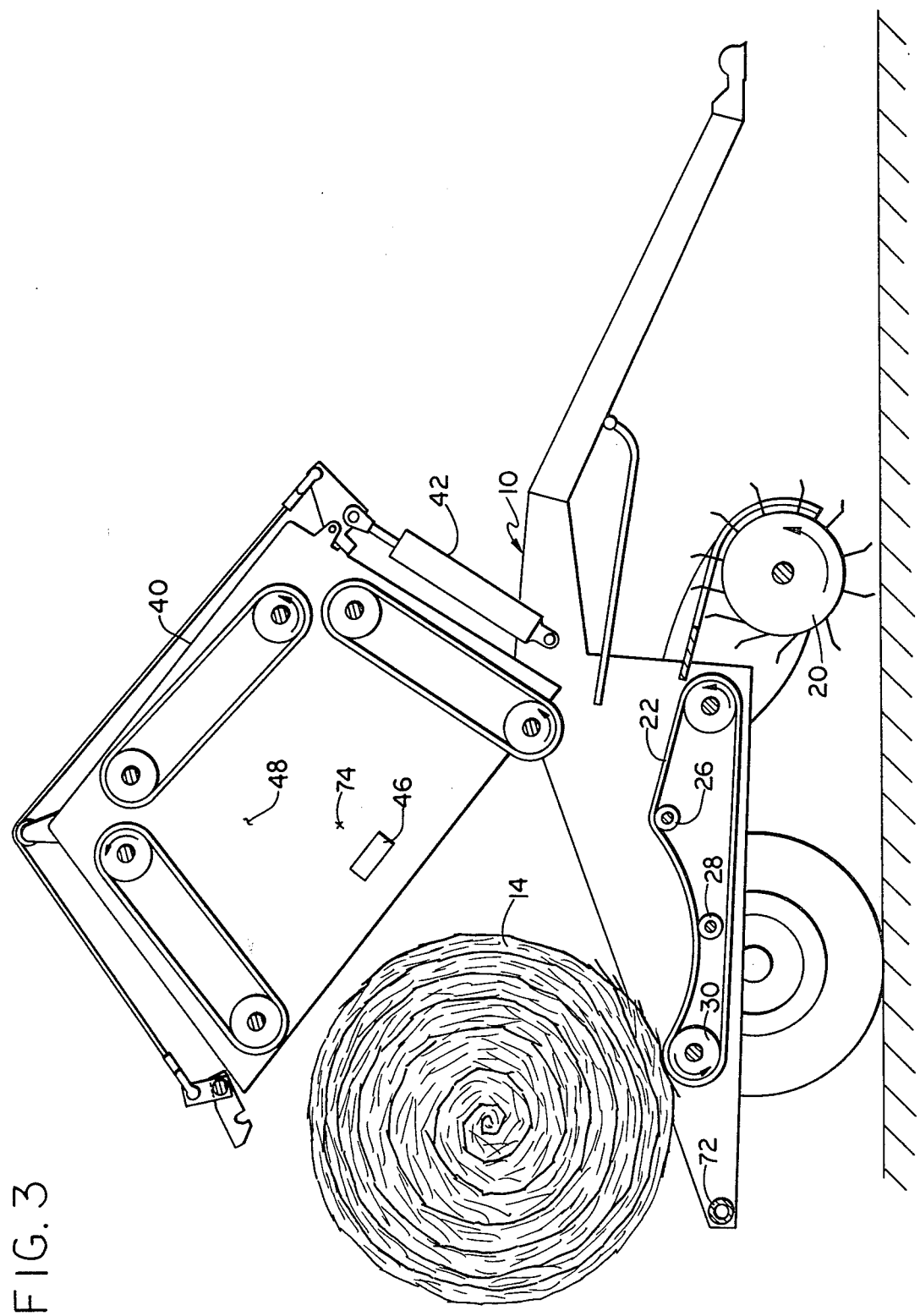
FIG. 3 is a cutaway view of the bale in the act of being discharged and showing the location of the wedge mechanism on the raised sidewall.

Once out of the depression in the bottom conveyor, bale 14 will reach the position shown in FIG. 3. Bale 14 rides over rear roll 30, drops downward onto back frame member 72 and rolls off onto the ground.

Soon after wedges 46 begin to dig into the tightly compacted outer edge of bale 14, the conveyor action of the belts transfers the center of rotation from the central axis to the upper edge. This transfer initiates rearward movement of the bale tearing it free from the projecting wedges. Once the center of mass passes roller 30, gravity and inertial forces combine to assure discharge. This stage is shown in FIG. 3.

FIG. 3 also shows the position of wedge component 46 in sidewall 48 of subframe 40 when it has been rotated into the open tailgate position by hydraulic cylinder 42. It will be noted that wedge component 46 is positioned below point 74 which is adjacent the center axis of the baling chamber when the tailgate is in the closed position.

While the invention has been described in conjunction with a baler which includes a tailgate which opens rearward like a clam shell to enable discharge of a completed bale, it will be understood that it can be of utility in other embodiments.

Secondly, our invention has been shown as being implemented in a baler having a baling chamber of fixed size. The invention is of equal utility for all types of round balers whether they use belts, chains and cross slats or rollers. The heart of our invention is to utilize bale contacting means synchronized with the opening of the tailgate for introducing a coupling force to stop the bale from continuing to rotate about its central axis, this application of a coupling force thereby allowing the bottom conveyor to move the completed bale out of the baler. This coupling force can be introduced either by wedges operating as explained above or by a hydraulic actuated rod which penetrates into the baling chamber during the ejection cycle in those machines wherein the sidewalls of the baler remain fixed over a greater portion of the ends of the bale. Tests showed that for most types of crops, the bale would eject when the coupling force was applied to only one end of the bale. That being the case, a hydraulical, an electric or mechanically actuated rod would function equally as well if it made contact with the upper periphery of the bale at any convenient point along its length.

It is therefore evident that various other changes in the details, materials, steps and arrangement of parts may be made and will occur to those skilled in the art upon a reading of the above disclosure. Therefore, the invention should not be limited to the specific illustration disclosed, but only by the following claims.

We claim:

1. An ejection mechanism for use with a baler of the type wherein is a wheel mounted cage-like frame surrounding a baling chamber of generally cylindrical shape having closed sidewalls adjacent the ends of the bale, the baling chamber being divided into two portions with one portion being hinge mounted along one edge to allow the second edge to swing open as a gate through which a completed bale can be discharged, the gate being maintained in a closed condition during the remainder of the bale forming operation, the second portion of the baling chamber including a bottom conveyor for continuously adding crop material to the periphery of the bale during the bale forming process, said bottom conveyor additionally serving to impart rotational motion to the partially completed bale, said ejection mechanism comprising:

bale contacting means synchronized with the opening of said gate for introducing a coupling force which applies force to stop the bale from turning, thereby allowing the bottom conveyor to move the completed bale out of the baler.

2. The invention as defined in claim 1 wherein the bale contacting means includes a pair of wedge shaped components extending inwardly into said baling chamber, one in each sidewall, each wedge being positioned so as to contact the top edge of said bale when said gate reaches its fully open condition, the orientation of said wedges being such as to present the thick end of each wedge against the rotational direction of the bale, thereby tending to stop said bale from turning.

3. The invention as defined in claim 2 wherein the baler includes sidewalls which are integral with that portion of the baling chamber which is hinge mounted along one edge.

4. The invention as defined in claim 3 wherein a wedge shaped component is mounted on that location on each chamber sidewall which is slightly below the center axis for the condition when the baling chamber is closed, the orientation of each wedge being such that the thin edge is toward the front of the baler.

5. The invention as defined in claim 4 wherein the wedge shaped components include means for flexing in and out in response to pressure applied from the baling chamber.

6. The invention as defined in claim 1 wherein the bale contacting means includes at least one rod which penetrates into the baling chamber during the ejection cycle.

* * * * *